(12) United States Patent
Samad et al.

(10) Patent No.: US 7,469,177 B2
(45) Date of Patent: Dec. 23, 2008

(54) DISTRIBUTED CONTROL ARCHITECTURE FOR POWERTRAINS

(75) Inventors: Tariq Samad, Minneapolis, MN (US); Syed M. Shahed, Rancho Palos Verdes, CA (US); Joseph Z. Lu, Glendale, AZ (US); Gregory E. Stewart, Vancouver (CA); Vladimir Ravlena, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/155,996

(22) Filed: Jun. 17, 2005

(65) Prior Publication Data

US 2006/0287795 A1    Dec. 21, 2006

(51) Int. Cl.
*G06F 7/00* (2006.01)
*G06F 17/00* (2006.01)
*F02B 47/08* (2006.01)
*F01N 3/00* (2006.01)

(52) U.S. Cl. ............................ 701/54; 701/48; 701/51; 701/60; 701/61; 701/101; 701/102; 701/103; 701/104; 701/105; 701/106; 701/107; 701/108; 701/109; 123/406.45; 123/406.47; 123/406.48; 123/445; 123/568.11; 60/272; 60/276; 60/285; 700/2; 700/3; 700/9; 700/10; 700/28

(58) Field of Classification Search .................. 701/51, 701/60, 61, 101–109, 48, 54; 123/406.45, 123/406.47, 406.48, 445, 568.11–568.29; 60/272, 276, 285; 700/2, 3, 9, 10, 28
See application file for complete search history.

(56) References Cited

U.S. PATENT DOCUMENTS 3,744,461 A    7/1973    Davis (Continued)

FOREIGN PATENT DOCUMENTS

DE    3515040    7/1986

(Continued)

OTHER PUBLICATIONS

"SCR, 400-csi Coated Catalyst," Leading NOx Control Technologies Status Summary, 1 page prior to the filing date of the present application.

(Continued)

*Primary Examiner*—Jack W Keith
*Assistant Examiner*—Chuong P Nguyen
(74) *Attorney, Agent, or Firm*—Kris T. Fredrick (57) ABSTRACT

Systems and methods for controlling automotive powertrains using a distributed control architecture are disclosed. A distributed control system may include a supervisory control unit for controlling one or more powertrain subsystems, and one or more subsystem control units in communication with the supervisory control unit. The supervisory control unit can be configured to execute a central optimization algorithm that computes variables from across multiple powertrain subsystems, and then outputs a number of globally approximated command values to each associated subsystem control unit. In some embodiments, the central optimization algorithm can be configured to solve a global cost function or optimization routine. One or more of the subsystem control units can be configured to execute a lower-level algorithm or routine, which can comprise a higher-fidelity model than that used by the central optimization algorithm.

20 Claims, 8 Drawing Sheets

U.S. PATENT DOCUMENTS

| | | |
|---|---|---|
| 4,005,578 A | 2/1977 | McInerney |
| 4,055,158 A | 10/1977 | Marsee |
| 4,252,098 A | 2/1981 | Tomczak et al. |
| 4,383,441 A | 5/1983 | Willis et al. |
| 4,426,982 A | 1/1984 | Lehner et al. |
| 4,438,497 A | 3/1984 | Willis et al. |
| 4,456,883 A | 6/1984 | Bullis et al. |
| 4,485,794 A | 12/1984 | Kimberley et al. |
| 4,601,270 A | 7/1986 | Kimberley et al. |
| 4,653,449 A | 3/1987 | Kamei et al. |
| 5,044,337 A | 9/1991 | Williams |
| 5,076,237 A | 12/1991 | Hartman et al. |
| 5,089,236 A | 2/1992 | Clerc |
| 5,108,716 A | 4/1992 | Nishizawa |
| 5,123,397 A | 6/1992 | Richeson |
| 5,150,694 A * | 9/1992 | Currie et al. ............... 123/687 |
| 5,233,829 A | 8/1993 | Komatsu |
| 5,282,449 A | 2/1994 | Takahashi et al. |
| 5,349,816 A | 9/1994 | Sanbayashi et al. |
| 5,365,734 A | 11/1994 | Takeshima |
| 5,398,502 A | 3/1995 | Watanabe |
| 5,452,576 A | 9/1995 | Hamburg et al. |
| 5,477,840 A | 12/1995 | Neumann |
| 5,481,456 A | 1/1996 | Ogura |
| 5,558,178 A | 9/1996 | Hess et al. |
| 5,560,208 A | 10/1996 | Halimi et al. |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,690,086 A | 11/1997 | Kawano et al. |
| 5,692,478 A | 12/1997 | Nogi et al. |
| 5,746,183 A | 5/1998 | Parke et al. |
| 5,765,533 A | 6/1998 | Nakajima |
| 5,771,867 A | 6/1998 | Amstutz et al. |
| 5,775,296 A | 7/1998 | Goeras et al. |
| 5,785,030 A | 7/1998 | Paas |
| 5,788,004 A | 8/1998 | Friedmann et al. |
| 5,846,157 A | 12/1998 | Reinke et al. |
| 5,893,092 A | 4/1999 | Driscoll |
| 5,942,195 A | 8/1999 | Lecea et al. |
| 5,964,199 A | 10/1999 | Atago et al. |
| 5,964,811 A | 10/1999 | Ishii et al. |
| 5,974,788 A | 11/1999 | Hepburn et al. |
| 6,029,626 A | 2/2000 | Bruestle |
| 6,035,640 A | 3/2000 | Kolmanovsky et al. |
| 6,048,620 A | 4/2000 | Zhong |
| 6,055,810 A | 5/2000 | Borland et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,105,365 A | 8/2000 | Deeba et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,216,083 B1 | 4/2001 | Ulyanov et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,289,883 B1 * | 9/2001 | Wakutani et al. ....... 123/568.21 |
| 6,312,538 B1 | 11/2001 | Latypov et al. |
| 6,321,538 B2 | 11/2001 | Hasler |
| 6,338,245 B1 | 1/2002 | Shimoda et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,379,281 B1 | 4/2002 | Collins et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,463,733 B1 | 10/2002 | Asik et al. |
| 6,463,734 B1 | 10/2002 | Tamura et al. |
| 6,470,682 B2 | 10/2002 | Gray, Jr. |
| 6,470,886 B1 | 10/2002 | Jestrabek-Hart |
| 6,502,391 B1 | 1/2003 | Hirota et al. |
| 6,512,974 B2 | 1/2003 | Houston et al. |
| 6,546,329 B2 | 4/2003 | Bellinger |
| 6,560,528 B1 | 5/2003 | Gitlin et al. |
| 6,571,191 B1 | 5/2003 | York et al. |
| 6,579,206 B2 | 6/2003 | Liu et al. |
| 6,612,293 B2 | 9/2003 | Schweinzer et al. |
| 6,625,978 B1 | 9/2003 | Eriksson et al. |
| 6,629,408 B1 | 10/2003 | Murakami et al. |
| 6,647,710 B2 | 11/2003 | Nishiyama et al. |
| 6,647,971 B2 | 11/2003 | Vaughan et al. |
| 6,651,432 B1 * | 11/2003 | Gray, Jr. .................... 60/605.2 |
| 6,671,603 B2 | 12/2003 | Cari et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,705,084 B2 | 3/2004 | Allen et al. |
| 6,742,330 B2 | 6/2004 | Genderen |
| 6,758,037 B2 | 7/2004 | Terada et al. |
| 6,766,230 B1 * | 7/2004 | Rizzoni et al. ................ 701/29 |
| 6,789,533 B1 | 9/2004 | Hashimoto et al. |
| 6,823,667 B2 | 11/2004 | Braun et al. |
| 6,823,675 B2 | 11/2004 | Brunell et al. |
| 6,826,903 B2 | 12/2004 | Yahata et al. |
| 6,827,061 B2 | 12/2004 | Nytomt et al. |
| 7,016,779 B2 * | 3/2006 | Bowyer ..................... 701/108 |
| 2001/0002591 A1 | 6/2001 | Majima |
| 2002/0029564 A1 | 3/2002 | Roth et al. |
| 2002/0056434 A1 | 5/2002 | Flamig-Vetter et al. |
| 2002/0073696 A1 | 6/2002 | Kuenstler et al. |
| 2002/0098975 A1 | 7/2002 | Kimura et al. |
| 2002/0170550 A1 | 11/2002 | Mitsutani |
| 2002/0173919 A1 | 11/2002 | Moteki et al. |
| 2002/0184879 A1 | 12/2002 | Lewis |
| 2002/0194835 A1 | 12/2002 | Bromberg et al. |
| 2003/0022752 A1 | 1/2003 | Liu et al. |
| 2003/0041590 A1 | 3/2003 | Kitajima et al. |
| 2003/0089101 A1 | 5/2003 | Tanaka et al. |
| 2003/0101713 A1 | 6/2003 | Dalla Betta et al. |
| 2003/0120410 A1 | 6/2003 | Cari et al. |
| 2003/0143957 A1 | 7/2003 | Lyon |
| 2003/0145837 A1 | 8/2003 | Esteghlal et al. |
| 2003/0150422 A1 | 8/2003 | Huh |
| 2003/0172907 A1 | 9/2003 | Nytomt et al. |
| 2003/0184152 A1 * | 10/2003 | Cikanek et al. ............. 303/152 |
| 2003/0200016 A1 | 10/2003 | Spillane et al. |
| 2003/0213465 A1 | 11/2003 | Fehl et al. |
| 2003/0221679 A1 | 12/2003 | Surnilla |
| 2003/0225507 A1 | 12/2003 | Tamura |
| 2004/0006973 A1 | 1/2004 | Makki et al. |
| 2004/0007211 A1 | 1/2004 | Kobayashi |
| 2004/0007217 A1 | 1/2004 | Poola et al. |
| 2004/0025837 A1 | 2/2004 | Hunt et al. |
| 2004/0034460 A1 | 2/2004 | Folkerts et al. |
| 2004/0040283 A1 | 3/2004 | Yasui et al. |
| 2004/0040287 A1 | 3/2004 | Beutel et al. |
| 2004/0050037 A1 | 3/2004 | Betta et al. |
| 2004/0055278 A1 | 3/2004 | Miyoshi et al. |
| 2004/0060284 A1 | 4/2004 | Roberts, Jr. et al. |
| 2004/0074226 A1 | 4/2004 | Tanaka |
| 2004/0089279 A1 | 5/2004 | McLaughlin et al. |
| 2004/0112335 A1 | 6/2004 | Makino et al. |
| 2004/0118117 A1 | 6/2004 | Hartman et al. |
| 2004/0128058 A1 | 7/2004 | Andres et al. |

| | | | |
|---|---|---|---|
| 2004/0129259 | A1 | 7/2004 | Mitsutani |
| 2004/0134464 | A1 | 7/2004 | Mogi |
| 2004/0135584 | A1 | 7/2004 | Nagy et al. |
| 2004/0139735 | A1 | 7/2004 | Zhu |
| 2004/0139951 | A1 | 7/2004 | Fisher et al. |
| 2004/0249533 | A1* | 12/2004 | Wheals et al. ............... 701/36 |
| 2004/0249558 | A1 | 12/2004 | Meaney |
| 2004/0250609 | A1* | 12/2004 | Shirakawa et al. ......... 73/118.1 |
| 2005/0131620 | A1* | 6/2005 | Bowyer ...................... 701/108 |
| 2006/0212140 | A1* | 9/2006 | Brackney ..................... 700/29 |

FOREIGN PATENT DOCUMENTS

| | | |
|---|---|---|
| DE | 10219382 | 11/2002 |
| EP | 1221544 | 7/2002 |
| JP | 59190443 | 10/1984 |
| WO | WO 02/100698 A1 * | 12/2002 |
| WO | WO 02/101208 | 12/2002 |
| WO | 03065135 | 8/2003 |
| WO | WO 2004/027230 | 4/2004 |

OTHER PUBLICATIONS

Advanced Petroleum-Based Fuels-Diesel Emissions Control (APBF-DEC) Project, "Quarterly Update," No. , 6 pages, Fall 2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control of EGR in Diesel Engines," IEEE TCST, vol. 3, No. 1, 12 pages, Mar. 1995.

Bemporad, et al., "Explicit Model Predictive Control," 1 page, prior to filing date of present application.

Borrelli, "Constrained Optimal Control of Linear and Hybrid Systems," Lecture Notes in Control and Information Sciences, vol. 290, 2003.

Catalytica Energy Systems, "Innovative NOx Reduction Solutions for Diesel Engines," 13 pages, 3rd Quarter, 2003.

Chatterjee, et al. "Catalytic Emission Control for Heavy Duty Diesel Engines," JM, 46 pages, prior to filing date of present application.

Delphi, Delphi Diesel NOx Trap (DNT), 3 pages, Feb. 2004.

GM "Advanced Diesel Technology and Emissions," powertrain technologies—Engines, 2 pages, prior to filing date of present application.

Guzzella, et al., "Control of Diesel Engines," IEEE Control Systems Magazine, pp. 53-71, Oct. 1998.

Havelena, "Componentized Architecture for Advanced Process Management," Honeywell International, 42 pages, 2004.

Hiranuma, et al., "Development of DPF System for Commercial Vehicle—Basic Characteristic and Active Regeneration Performance," SAE Paper No. 2003-01-3182, Mar. 2003.

Honeywell, "Profit Optimizer A Distributed Quadratic Program (DQP) Concepts Reference," 48 pages, prior to filing date of present application.

http://www.not2fast.wryday.com/turbo/glossary/turbo_glossary.shtml, "Not2Fast: Turbo Glossary," 22 pages, printed Oct. 1, 2004.

http://www.tai-cwv.com/sb1106.0.html, "Technical Overview-Advanced Control Solutions," 6 pages, printed Sep. 9, 2004.

Kelly, et al., "Reducing Soot Emissions from Diesel Engines Using One Atmosphere Uniform Glow Discharge Plasma," SAE Paper No. 2003-01-1183, Mar. 2003.

Kolmanovsky, et al., "Issues in Modeling and Control of Intake Flow in Variable Geometry Turbocharged Engines", 18th IFIP Conf. System Modeling and Optimization, pp. 436-445, Jul. 1997.

Kulhavy, et al. "Emerging Technologies for Enterprise Optimization in the Process Industries," Honeywell, 12 pages, Dec. 2000.

Locker, et al., "Diesel Particulate Filter Operational Characterization," Corning Incorporated, 10 pages, prior to filing date of present application.

Lu "Challenging Control Problems and Engineering Technologies in Enterprise Optimization," Honeywell Hi-Spec Solutions, 30 pages, Jun. 4-6, 2001.

Moore, "Living with Cooled-EGR Engines," Prevention Illustrated, 3 pages, Oct. 3, 2004.

National Renewable Energy Laboratory (NREL), "Diesel Emissions Control- Sulfur Effects Project (DECSE) Summary of Reports," U.S. Department of Energy, 19 pages, Feb. 2002.

Salvat, et al., "Passenger Car Serial Application of a Particulate Filter System on a Common Rail Direct Injection Engine," SAE Paper No. 2000-01-0473, 14 pages, Feb. 2000.

Shamma, et al. "Approximate Set-Valued Obeservers for Nonlinear Systems," IEEE Transactions on Automatic Control, vol. 42, No. 5, May 1997.

Soltis, "Current Status of NOx Sensor Development," Workshop on Sensor Needs and Requirements for PEM Fuel Cell Systems and Direct-Injection Engines, 9 pages, Jan. 25-26, 2000.

Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.

Storset, et al., "Air Charge Estimation for Turbocharged Diesel Engines," vol. 1 Proceedings of the American Control Conference, 8 pages, Jun. 28-30, 2000.

The Math Works, "Model-Based Calibration Toolbox 2.1 Calibrate complex powertrain systems," 4 pages, printed prior to filing date of present application.

The Math Works, "Model-Based Calibration Toolbox 2.1.2," 2 pages, prior to filing date of present application.

Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

Zenlenka, et al., "An Active Regeneration as a Key Element for Safe Particulate Trap Use," SAE Paper No. 2001-0103199, 13 pages, Feb. 2001.

* cited by examiner

DISTRIBUTED CONTROL ARCHITECTURE FOR POWERTRAINS

FIELD

The present invention relates generally to the field of automotive powertrains. More specifically, the present invention pertains to systems and methods for controlling automotive powertrains using a distributed control architecture.

BACKGROUND

Automotive powertrains are becoming increasingly complex with the use of multiple electronic control units (ECUs) to control a wide range of powertrain functions and vehicular dynamics. In the control of modern diesel engines, for example, more sophisticated control units are being utilized to control the output of particular types of emissions such as $NO_x$ or smoke while also improving fuel economy and torque output. With the exception of a few, small-scale control units, the control calculations for many conventional powertrain systems are typically performed centrally using a single electronic control unit, often as one algorithmic calculation that computes variables across multiple subsystems.

Based on the increased sophistication demanded by modern powertrain subsystems, the ability of a single, centralized electronic control unit to adequately respond to each subsystem component is becoming increasingly difficult. The airside, aftertreatment, and transmission control subsystems of many modern vehicles, for example, often employ sophisticated control algorithms requiring numerous state variables to be solved for. In such case, the ability of the electronic control unit to rapidly and reliably compute factors such as torque output, catalyst loading, boost pressure, etc. may be compromised, affecting overall system performance. This is particularly the case as new and/or modified subsystem components are added to the powertrain system, causing the overall complexity of the control algorithm to increase. In some situations, the failure of a particular subsystem component, or a communications fault between the electronic control unit and a subsystem component, can also affect system performance.

SUMMARY

The present invention pertains to systems and methods for controlling automotive powertrains using a distributed control architecture. A distributed control system for controlling an automotive powertrain in accordance with an illustrative embodiment of the present invention may include a supervisory control unit for controlling one or more powertrain subsystems, and one or more subsystem control units in communication with the supervisory control unit. The supervisory control unit can be configured to execute a central optimization algorithm that computes variables propagated upwardly from multiple powertrain subsystems and outputs command values to one or more associated subsystem control units. The central optimization algorithm may be a coarse-grained model, a simplified model, a steady-state model, or other suitable model of the powertrain system, allowing the central optimization algorithm to continue operation in the event that a communication failure occurs between the supervisory control unit and one or more of the subsystem control units.

In some embodiments, the central optimization algorithm can be configured to solve a global cost function or optimization routine that optimizes various powertrain state variables across multiple powertrain subsystems. In one illustrative embodiment, for example, the central optimization algorithm can be configured to solve a global cost function that provides globally approximated command values to a fuel injection control subsystem, a glow plug control subsystem, an air/EGR control subsystem, a transmission control subsystem, and/or an aftertreatment control subsystem. The central optimization algorithm can be configured to provide globally approximated command values to other types of subsystems (e.g. electric power machinery in a hybrid electric powertrain or electrically assisted turbocharger system), depending on the application.

One or more of the subsystem control units can be configured to run a lower-level (e.g. higher-fidelity) algorithm or routine using the globally approximated command values computed by the supervisory control unit. In certain embodiments, for example, a separate air/EGR electronic control unit (ECU) can be configured to execute an airside optimization algorithm or routine adapted to output one or more airside control signals based on command values and/or feed-forward signals sent from the supervisory control unit. A similar subsystem calculation can be performed by the other subsystem control units and/or one or more other lower-level controllers, as desired. The control variables computed by the various subsystem control units can be dynamically integrated through the supervisory control unit, resulting in dynamically varying local optimization criteria and constraints.

An illustrative method of controlling an automotive powertrain may include the steps of providing a supervisory control unit in communication with a plurality of powertrain subsystems, computing one or more parameters using a central optimization algorithm and outputting one or more globally optimized command values to one or more subsystem control units associated with the powertrain subsystems, computing one or more control set point values using at least one subsystem control unit, and outputting the one or more control set point values to a subsystem component and/or actuator.

By optimizing the various parameters of the powertrain system using a distributed control architecture, changes in load, pedal input, fuel quality, and/or other exogenous factors can be responded to rapidly and reliably, allowing the vehicle to operate with improved fuel economy, reduced emissions, and improved torque response. Moreover, by providing a coordination layer and modeling the various powertrain parameters using a supervisory control unit, a communication failure between the supervisory control unit and one of the subsystem control units will not adversely affect the operation of the other subsystems, thus providing an enhanced level of robustness and reliability to the overall powertrain system.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of operational steps and powertrain systems are illustrated in the various views, those skilled in the art will recognize that many of the examples provided have suitable alternatives that can be utilized.

Figure 1:
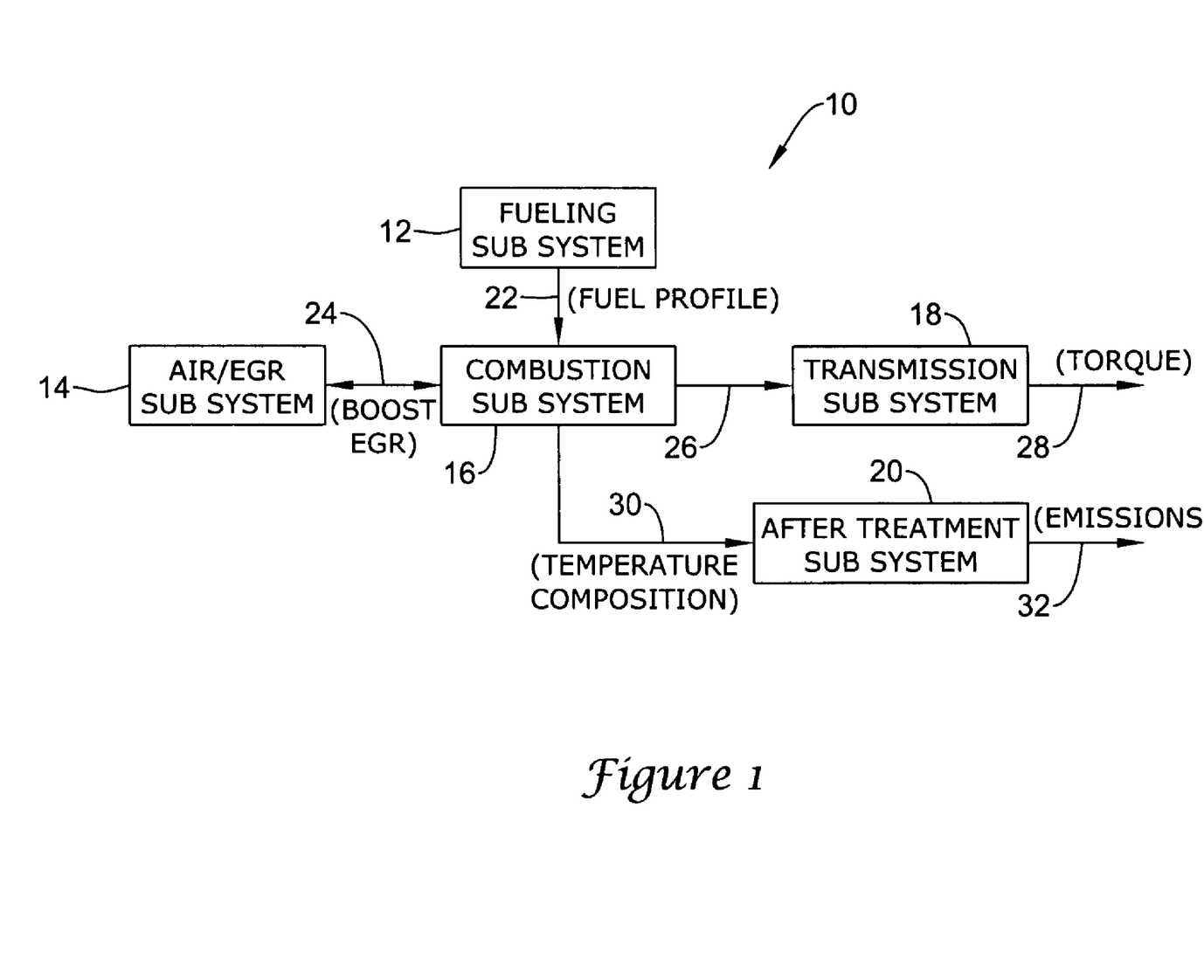
FIG. 1 is a schematic view showing an illustrative automotive powertrain system including a number of powertrain subsystems.

FIG. 1 is a schematic view showing an illustrative automotive powertrain system 10 including a number of powertrain subsystems that can be utilized to control various aspects of fuel delivery, combustion, air injection, transmission, as well as the aftertreatment of $NO_x$, particulate matter (PM), and/or other emissions. As shown in FIG. 1, the powertrain system 10 may include a fueling subsystem 12, an air/EGR subsystem 14, a combustion subsystem 16, a transmission subsystem 18, and an aftertreatment subsystem 20. It should be understood, however, that the powertrain system 10 may include other subsystem components in addition to, or in lieu of, those depicted in FIG. 1, depending on the particular application. Examples of other powertrain subsystem components may include, but are not limited to, a glow plug subsystem for use in diesel engine start-up, a braking subsystem, a suspension subsystem, a speed governor subsystem, an electrically assisted turbocharger system, a hybrid powertrain electrical subsystem, and a theft-detection/engine shut-off subsystem for theft prevention.

The fueling subsystem 12 can be configured to accept various driver commands that can be utilized to provide a desired fuel profile 22 to the combustion subsystem 16. The combustion subsystem 16 may include a diesel engine, a spark-ignition engine, a hybrid electric/gas engine, a displacement-on-demand engine, or other suitable plant. Depending on the type of engine, the fueling subsystem 12 may include a number of fuel injectors that can be independently controlled to provide a desired fuel profile 22 based on factors such as pedal position, change in pedal position, brake position, or other driver command. The term fuel "profile", as used herein, can include any number of fuel parameters or characteristics including, for example, fuel delivery rate, change in fuel delivery rate, fuel timing, fuel pre-injection event(s), fuel post-injection event(s), fuel pulses, and/or any other fuel delivery characteristic, as desired.

An air/EGR subsystem 14 can be configured to provide airside and exhaust gas recirculation (EGR) control to the combustion subsystem 16. The air/EGR subsystem 14 may include a number of airside actuators that can be used to control the quantity and/or temperature of air delivered to the combustion/engine subsystem 16. In those embodiments where the combustion/engine subsystem 16 comprises a diesel engine, for example, the air subsystem 14 may include a turbocharger, an air compressor, a compressed air cooler, a charge-air cooler (CAC), an EGR valve, an EGR cooler, as well as other desired components. Alternatively, and in other embodiments, the air/EGR subsystem 14 may include those airside components typically associated with the use of spark-ignition engines such as air throttles, which meter air into the engine based on a desired stoichiometric ratio. As indicated generally by arrow 24, the air/EGR subsystem 14 can be configured to receive and transmit various air control signals back and forth to and from the combustion subsystem 16. Examples of such air control signals 24 may include a boost pressure signal for adjusting the amount of air into the intake manifold of the engine, a compressor cooler signal for adjusting the temperature of air into the intake manifold, and an EGR control signal to set a desired amount of gas recirculation. The number and type of air control signals 24 may vary, however, depending on the type of engine used by the combustion subsystem 16 as well as the type of actuator components controlled by each of the other subsystems 12, 14, 18, 20.

The combustion subsystem 16 can be configured to provide several control signals that can be used to control the transmission subsystem 18 and the aftertreatment subsystem 20. As indicated generally by arrow 26, for example, the combustion subsystem 16 can be configured to output a transmission control signal to the transmission subsystem 18 that can be used to adjust factors such as the level of torque output 28 provided by the transmission, the shift points for the transmission, the number of wheels driven (e.g. 2-wheel drive, 4-wheel drive), etc. Furthermore, and as indicated generally by arrow 30, the combustion subsystem 16 can be configured to output various aftertreatment control signals that can be used by the aftertreatment subsystem 20 to control the temperature and/or composition of exhaust gas or other emissions 32 discharged from the exhaust manifold of the engine.

A number of sensors may be provided for monitoring the operation of those components controlled by each of the subsystems 12, 14, 16, 18, 20. In certain embodiments, for example, an intake manifold air pressure (MAP) sensor and an intake manifold air flow (MAF) sensor can be provided to take measurements of the pressure and flow of air at the intake manifold of the engine. A manifold air temperature (MAT) sensor can also be provided in some embodiments to provide a measure of the intake manifold air temperature. A $NO_x$ and/or particular matter (PM) sensor may be provided to take measurements of the $NO_x$ and PM concentration in the exhaust gas. One or more other sensors may be provided to sense other parameters, as desired.

Figure 2:
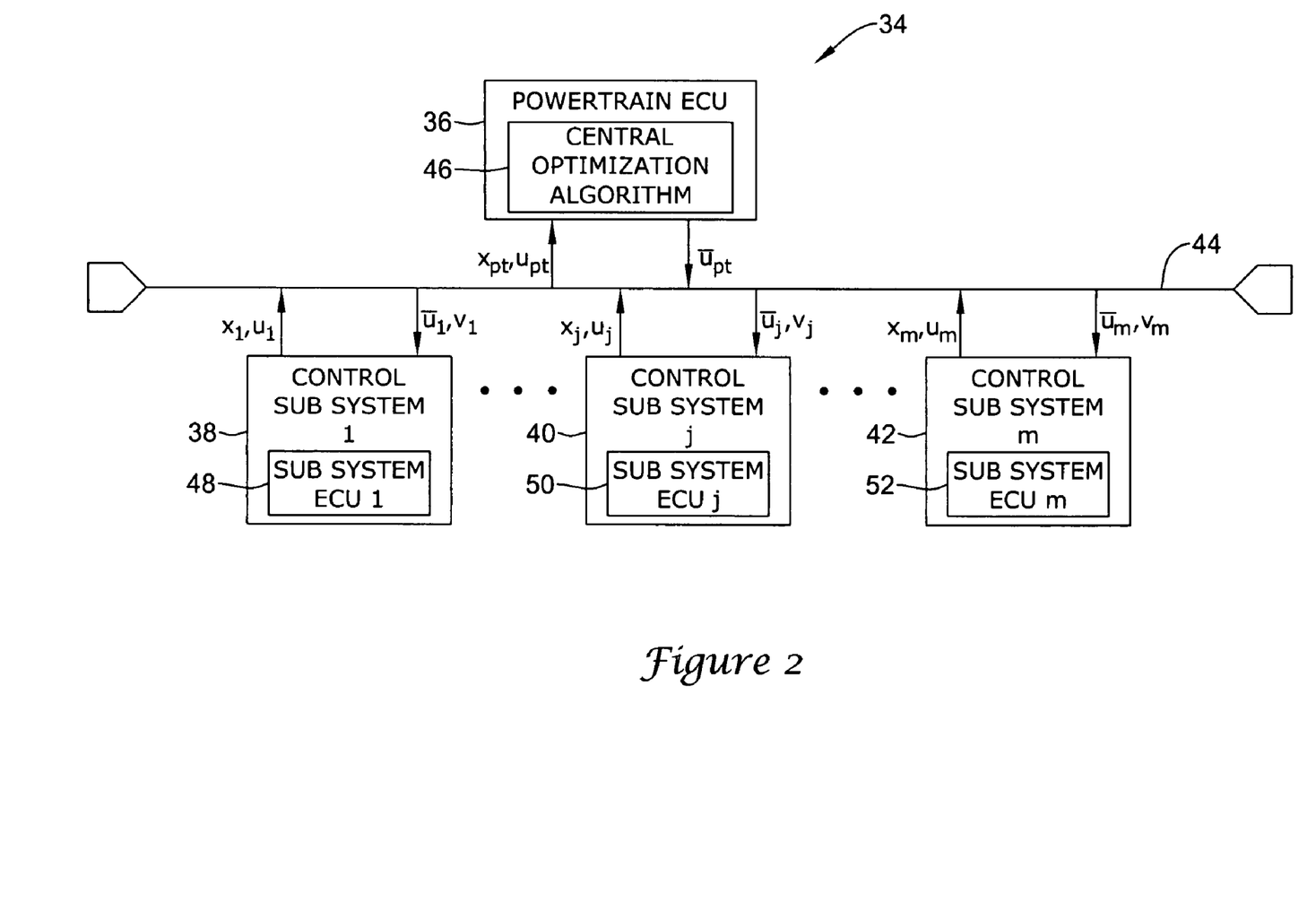
FIG. 2 is a schematic view showing a distributed powertrain control system in accordance with an illustrative embodiment of the present invention.

FIG. 2 is a schematic view showing a distributed powertrain control system 34 in accordance with an illustrative embodiment of the present invention. As shown in FIG. 2, system 34 may include a supervisory powertrain electronic control unit (ECU) 36 in communication with a number of powertrain control subsystems 38, 40, 42 using a communications network or bus 44. Connection of the powertrain ECU 36 to the various control subsystems 38, 40, 42 can be accomplished, for example, by a controller-area network (CAN), a wireless communication network, a dedicated communication link, or other suitable communication means. As is described in greater detail below with respect to several examples, the powertrain ECU 36 can be configured to execute a central optimization algorithm 46 that integrates multiple control subsystems 38, 40, 42 together into a distributed control architecture that ensures that one or more of the control subsystems 38, 40, 42 operate in an optimized fashion.

The central optimization algorithm 46 can be configured to compute a number of globally approximated command values $\bar{u}_{PT}$ that can be fed to the various control subsystems 38, 40, 42 for further analysis using a lower-level, and in some cases higher-fidelity, subsystem algorithm or routine. As indicated generally by $\bar{u}_1, \ldots, \bar{u}_j, \ldots \bar{u}_m$, the globally approximated command values $\bar{u}_{PT}$ outputted by the central optimization algorithm 46 can be associated such that each command value is fed to its corresponding subsystem 38, 40, 42. In other words, each of the command signals sent from the central optimization algorithm 46 can comprise a component of the powertrain ECU 36 signal such that:

$$\bar{u} = \bigcup_{j=1}^{m} \bar{u}_j,$$

$$\bar{x} = \bigcup_{j=1}^{m} x_j,$$

$$u = \bigcup_{j=1}^{m} u_j,$$

Assuming, for example, that the control subsystem 38 labeled as "control subsystem 1" in FIG. 2 comprises an air/EGR control subsystem having its own separate air/EGR controller, then the globally approximated command values $\bar{u}_1$ for that particular subsystem can include computed values such as boost pressure, charge air temperature, turbocharger vane position (e.g. for variable-geometry turbochargers), waste gate position (e.g. for waste gated turbochargers), EGR fraction, and/or other desired airside parameter. Similarly, if the subsystem 40 labeled "control system j" in FIG. 2 comprises a fuel injection control subsystem, then the globally approximated command values $\bar{u}_j$ for that particular subsystem can include computed values such as fuel amount, fuel injection timing, and/or other fuel-side parameters.

The central optimization algorithm 46 can be further configured to provide a number of feedforward signals $v_1, v_j, \ldots v_m$ to one or more of the control subsystems 38, 40, 42 for computing various parameters at the subsystem level using control signals computed by other subsystems 38, 40, 42. In certain embodiments, for example, the feedforward signals $v_1, v_j, \ldots v_m$ passed to the control subsystems 38, 40, 42 may represent various feedforward signals used by the central optimization algorithm 46 in providing a globally approximated solution for another control subsystem 38, 40, 42. In some cases, the feedforward signals $v_1, v_j \ldots v_m$ can comprise another subsystem's actuator move such that:

$$v_j = u_i; \text{ where } i \neq j.$$

In addition, and in other embodiments, the feedforward signals $v_1, v_j \ldots v_m$ may also comprise measured variables from other parts of the powertrain such as speed, torque, etc. If, for example, control subsystem 38 in FIG. 2 represents an air/EGR control subsystem, then powertrain signal $v_1$ may represent one or more parameters sent to the fuel-side subsystem (e.g. control subsystem 40). A similar formulation can be accomplished for the other control subsystems within the powertrain system 34, as desired.

As can be further seen in FIG. 2, one or more of the control subsystems 38, 40, 42 can include a subsystem electronic control unit (ECU) 48, 50, 52 that can be used to compute control signals based on the globally approximated command values $\bar{u}_1, \bar{u}_j \ldots \bar{u}_m$ received from the central optimization algorithm 46. In certain embodiments, for example, the subsystem ECUs 48, 50, 52 can be configured to execute a lower-level optimization algorithm or routine that can be used to optimize parameters for that particular subsystem. The subsystem ECU algorithm or routine can be executed using the command signals or targets $\bar{u}_1, \bar{u}_j, \ldots \bar{u}_m$ received from the powertrain ECU 36 as input, with the output of the subsystem ECUs 48, 50, 52 being used to control the associated control subsystem 38, 40, 42. In some cases, the lower-level algorithm or routine can include a higher-fidelity model of the control subsystem 38, 40, 42 than that used by the central optimization algorithm 46. The powertrain state variables $x_1, x_j \ldots x_m$ and control variables $u_1, u_j \ldots u_m$ outputted from each of the control subsystems 38, 40, 42 can then be propagated upwardly to the central optimization algorithm 46 and used to provide a globally approximated solution of the overall powertrain system 34.

The powertrain ECU 36 and each subsystem ECU 48, 50, 52 can be configured to operate using a number of constraints. Examples of such constraints may include $NO_x$ and PM emission limits, limits on turbocharger speed, limits on engine-out exhaust temperature, limits on manifold and/or cylinder pressures, etc. The constraints may contain default values preprogrammed within the ECUs 36, 48, 50, 52, values provided by some other source or target, or both. In some embodiments, for example, the constraints may comprise values stored within a memory unit of the powertrain ECU 36 or one of the subsystem ECUs 48, 50, 52.

Figure 3:
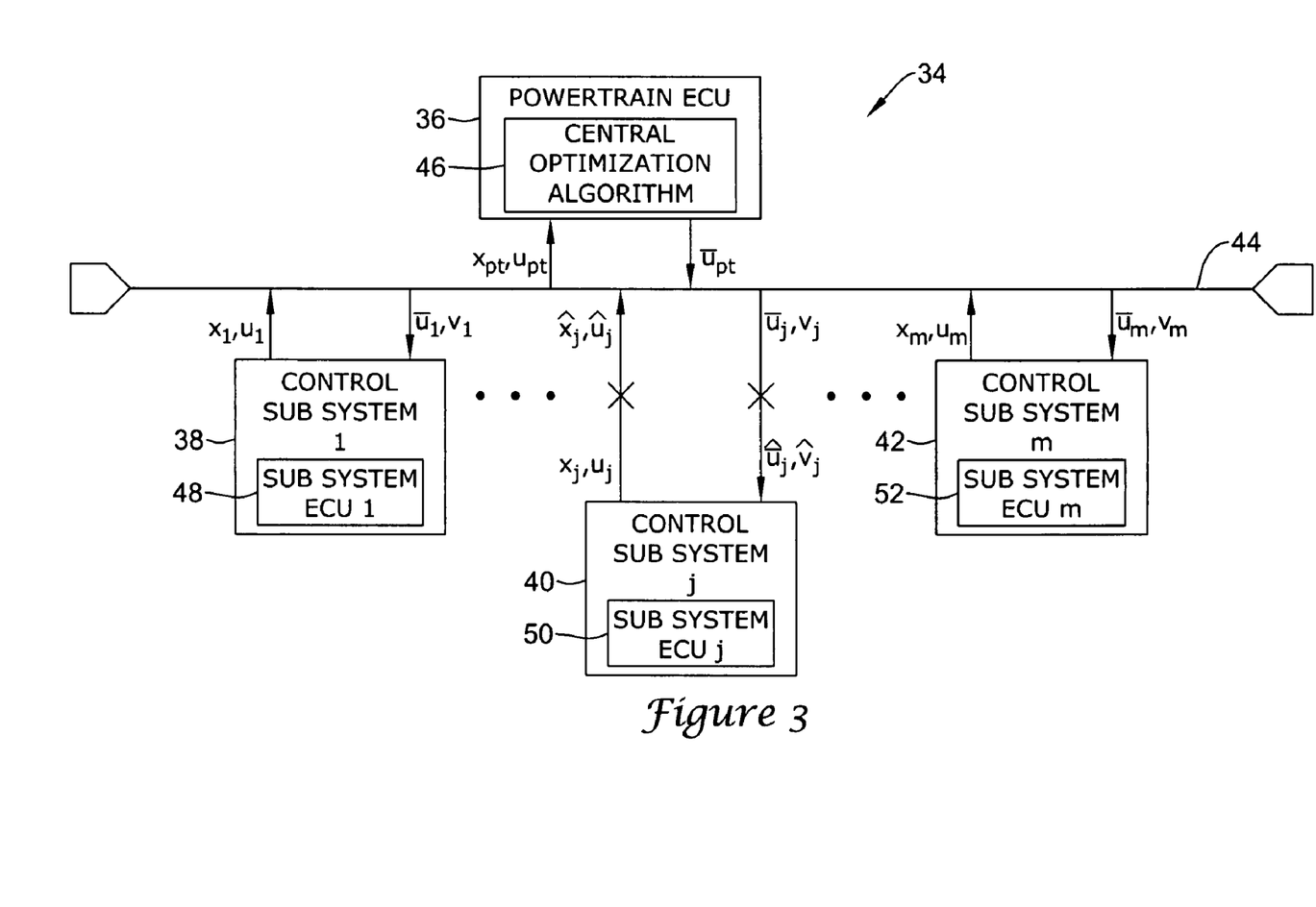
FIG. 3 is another schematic view of the distributed powertrain control system of FIG. 2 showing a communication failure between the powertrain electronic control unit and one of the subsystem control units.

In the event of a communication failure between the powertrain ECU 36 and one or more of the subsystem ECUs 48, 50, 52, the powertrain ECU 36 can be configured to substitute the signals received from the non-responsive subsystem ECU 48, 50, 52 with a modeled signal for a limited time, thus ensuring that the global constraints used by the central optimization algorithm 46 are not violated. As shown in FIG. 3, for example, if control subsystem 40 stops communicating with the powertrain ECU 36 due to a broken connection, power loss, or other such communication failure, the powertrain ECU 36 can be configured to replace the true signals $x_j$, $u_j$ normally received from that control subsystem 40 with a modeled signal $\hat{x}_j, \hat{u}_j$, allowing central optimization algorithm 46 to remain stable until such time that the communication link is re-established. Thus, by providing a coordination layer and modeling the various powertrain parameters globally using a supervisory powertrain ECU 36, any communication failure between the powertrain ECU 36 and one of the control subsystems 38, 40, 42 will not adversely affect the operation of the other control subsystems 38, 40, 42, thus providing an enhanced level of robustness and reliability to the overall powertrain system 34. Such a coordination layer also enables easier updating and maintenance of optimizers at the subsystem level without affecting the other subsystem optimizers, thus making such powertrain system 34 more flexible.

Figure 4:
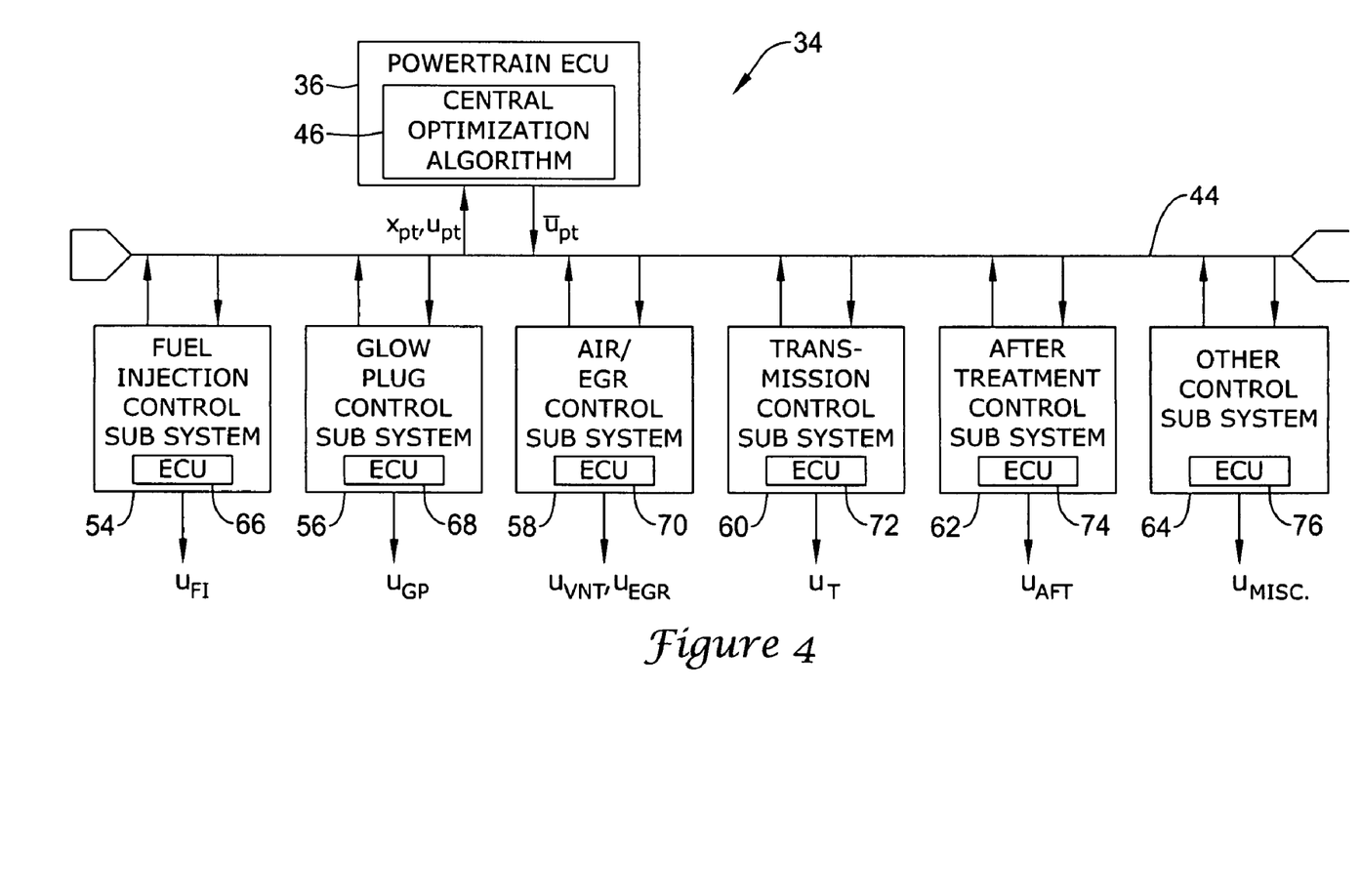
FIG. 4 is a schematic view showing an illustrative implementation of the distributed powertrain control system of FIG. 2.

Referring now to FIG. 4, an illustrative implementation of the distributed powertrain control system 34 of FIG. 2 will now be described. In the illustrative embodiment depicted in FIG. 4, the powertrain ECU 36 is shown connected via network or bus 44 to a number of illustrative powertrain subsystems, including a fuel injection control subsystem 54, a glow plug control subsystem 56, an air/EGR control subsystem 58, a transmission control subsystem 60, and an aftertreatment control subsystem 62. As indicated generally by reference number 64, the powertrain ECU 36 can be further connected to one or more other control subsystems of the powertrain system 34, and/or to one or more other vehicular systems, if desired. In certain embodiments, for example, the powertrain ECU 36 can be configured to provide supervisory control over a speed governor subsystem that can be used to cut-off and/or limit fuel delivered to the engine when the vehicle reaches a certain speed.

Each of the control subsystems 54, 56, 58, 60, 62, 64 can include their own corresponding subsystem electronic control unit (ECU) 66, 68, 70, 72, 74, 76 that can be used to optimize various powertrain variables at the subsystem level. The subsystem ECUs 66, 68, 70, 72, 74, 76 can be configured to execute a lower-level algorithm or routine that can be used to optimize parameters for that particular subsystem using the globally approximated command values and feedforward signals as inputs. The powertrain state variables and control variables outputted from each of the control subsystems 54, 56, 58, 60, 62, 64 can then be propagated upwardly to the central optimization algorithm 46 and used to provide a globally approximated solution of the overall powertrain system 34.

In addition to propagating the locally-optimized control variables upwardly to the powertrain ECU 36, one or more of the subsystem ECUs 66, 68, 70, 72, 74, 76 can be further configured to output command variables to one or more other sub-control units. As shown in the illustrative embodiment of FIG. 4, for example, each of the subsystem ECUs 66, 68, 70, 72, 74, 76 can be configured to send a respective command signal $u_{FI}$, $u_{GP}$, $u_{VNT}$, $u_{EGR}$, $u_T$, $u_{AFT}$, $u_{MISC}$ to one or more corresponding lower controllers (not shown) for optimization at the sub-controller level. In some embodiments, the lower-level controllers may comprise single-input-single-output (SISO) type controllers such as PID controllers. In other embodiments, the lower-level controllers can be configured to execute higher-fidelity algorithms or routines for more complex control of the subsystem.

The calculations for the different control subsystems 54, 56, 58, 60, 62, 64 can be accomplished on separate ECUs 66, 68, 70, 72, 74, 76, with the communication between the powertrain ECU 36 and each subsystem ECU 66, 68, 70, 72, 74, 76 being accomplished over the network or bus 44, as shown in FIG. 4. Alternatively, and in other embodiments, all of the calculations for the various control subsystems 54, 56, 58, 60, 62, 64 can be accomplished on a single ECU (e.g. using the powertrain ECU 36). In some embodiments, multiple ECUs 66, 68, 70, 72, 74, 76 from multiple control subsystems 54, 56, 58, 60, 62, 64 can be pooled together to take advantage of available computational resources, if desired.

Figure 5:
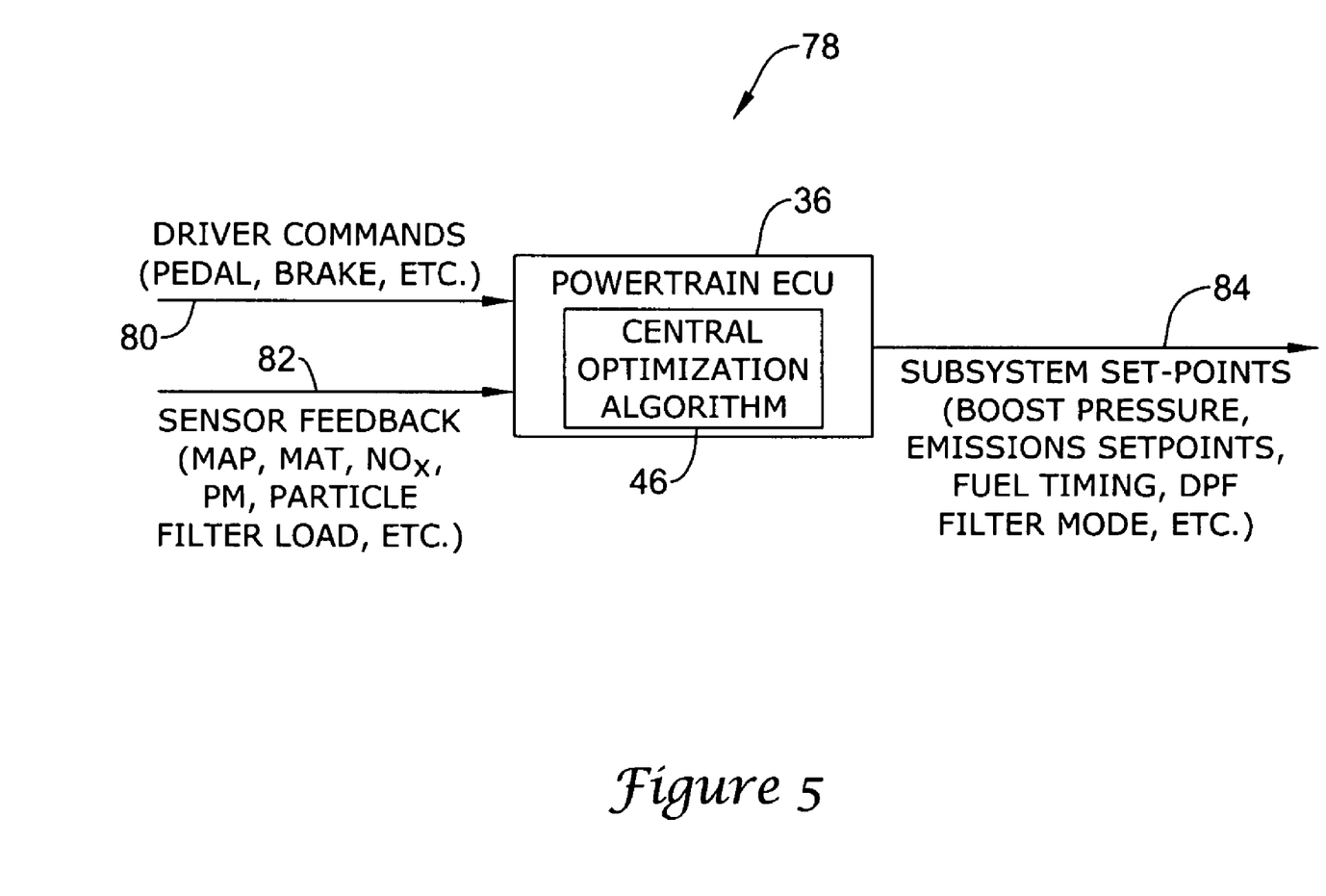
FIG. 5 is a schematic view showing an illustrative method of optimizing one or more subsystem targets in accordance with an exemplary embodiment of the present invention.

FIG. 5 is a schematic view showing an illustrative method 78 of optimizing one or more subsystem targets in accordance with an exemplary embodiment of the present invention. As shown in FIG. 5, the powertrain ECU 36 can be configured to receive a number of driver commands 80 relating to the fuel-side control of the engine, including, for example, a pedal position signal, a brake signal, or any other related fuel profile signal. In addition, and as indicated generally by arrow 82, the powertrain ECU 36 can also be configured to receive various sensor signals including, for example, a manifold air pressure (MAP) signal, a manifold air temperature (MAT) signal, a $NO_x$ emissions signal, a PM emissions signal, and a particle filter load signal (e.g. from a diesel particle filter (DPF)). It should be understood, however, that the powertrain ECU 36 can be configured to receive other parameters and/or signals, depending on the particular application.

The powertrain ECU 36 can be configured to work with a coarse-grained model of the powertrain system, with its optimization proceeding in terms of set points 84 for the individual control subsystems 54, 56, 58, 60, 62, 64. Examples of set points 84 that can be outputted by the powertrain ECU 36 may include a boost pressure set point used in adjusting the boost pressure for the air/EGR control subsystem 58, emission set points for the control of the exhaust gas by the aftertreatment control subsystem 62, a DPF filter mode set point indicating whether the DPF filter is to run in either a "filter" mode or a "regeneration" mode, a fuel timing set point for use in controlling fuel injection for the fuel injection control subsystem 54, etc. Other types and/or numbers of set point signals can be outputted by the powertrain ECU 36, if desired.

To globally optimize the set points 84 at the powertrain ECU 36 level, the central optimization algorithm 46 can be configured to solve a global cost function and/or optimization criteria pertaining to one or more of the control subsystems 54, 56, 58, 60, 62, 64. In certain embodiments, for example, the central optimization algorithm 46 can be solved to minimize the following global cost function:

$$\min_{\overline{u}_{PT}} J * (x_{PT}) \tag{1}$$

subject to $$\dot{x}_{PT} = f_{PT}(x_{PT}, \overline{u}_{PT});$$

$$x_{PT}(0) = x_{PT}^0$$

$$\overline{u}_{PT,\min} \leq \overline{u}_{PT} \leq \overline{u}_{PT,\max}$$

where:

$x_{PT}$ represents the powertrain state variables for the powertrain system;

$\overline{u}_{PT}$ represents the command values computed for the control subsystems; and $f_{PT}(\bullet)$ is the powertrain model as used for central optimization.

For clarity of exposition, the formulation above is expressed in continuous time. Often in practice, however, discrete-time versions of the algorithms and models will be used. Similarly, the optimization criterion will often cover the predicted trajectories of the state variables rather than instantaneous values. Control effort penalties may also be included in the criterion, and other constraints (e.g. on rates of change of input, state, and output variables) may be added.

As can be seen from Equation (1) above, the command values $\overline{u}_{PT}$ used by the various control subsystems 54, 56, 58, 60, 62, 64 are the decision variables in the central optimization. The optimization may be model-based, in some cases using coarse-grained models that can be dynamically updated. Alternatively, and in other embodiments, the models can be steady-state gain models, omitting dynamic information. In some embodiments, a solver for performing optimization calculations may be necessary. Examples of suitable solvers may include, but are not limited to, linear programming solvers, nonlinear programming solvers, mixed-integer programming solvers, and/or quadratic programming solvers.

The global optimization criterion and global constraints used by the global cost function may result in dynamically varying local optimization criteria and constraints. As an example, the coordination between the engine and the aftertreatment control subsystem 62 can be based on maximizing the fuel economy under emission constraints at the aftertreatment control subsystem 62 output level. The catalyst size/volume can be selected to provide the required exhaust gas cleaning performance at maximum load/emission level, but is typically oversized at typical cruising power levels. The extra cleaning capacity can thus be fully utilized by modifying the constraints for optimization on the engine to provide additional space for improving fuel efficiency.

Once a global solution is obtained by the powertrain ECU 36 using a suitable model (e.g. a coarse-grained model), each subsystem optimizer is then given the component of the global solution that is relevant to that particular control subsystem. Once received, the subsystem ECU can be configured to optimize a subsystem-specific cost function, if desired. If, for example, the global solution determined by the powertrain ECU 36 includes initially optimized values for fuel control, then the subsystem ECU 66 for the fuel injection control subsystem 54 can be given those corresponding (i.e. globally approximately) fuel control variables for optimization at the subsystem level. A similar process can be repeated for the globally approximated variables used by the other subsystem ECUs 68, 70, 72, 74.

Once each control subsystem 54, 56, 58, 60, 62, 64 receives the corresponding globally approximated command values from the powertrain ECU 36, a subsystem optimizer at the subsystem level can be tasked to perform a more detailed optimization with a more detailed model, thereby refining the original approximated solution given by the powertrain ECU 36. If, for example, a particular control subsystem receives an approximated solution based on steady-state models that produced a new steady state operating point for the engine (e.g. fuel injection rate), then an optimization algorithm or routine performed at the subsystem level (or lower) could be performed to compute the best way to transition from the current steady-state condition to a new computed condition which may or may not be steady-state.

Throughout this process, the constraints at the control subsystem level (or below) can be propagated upwardly in the distributed control architecture such that the global optimizer used by the central optimization algorithm 36 is cognizant of all relevant restrictions on variable movements. Such process acts to protect the global constraints used by the central optimization algorithm 46, thus ensuring that the global constraints are not violated. In the event a violation is detected at the coordination level (e.g. at the powertrain ECU 36), the full problem need not be resolved, but instead a check can be made to see if the currently operating solution violates the new constraints. If not, no action is required at the coordination level. If so, a new globally approximated solution is obtained and communicated only to those elements that are affected by the change.

For instance, a problem occurring with the regeneration system for exhaust aftertreatment may require higher exhaust temperatures for continued operation within emission limits. Based on this increased demand, the powertrain ECU 36 may conclude that this can be achieved with post-injection fuel at the fuel injection control subsystem 54 level. As this occurs, other control subsystems such as the air/EGR control subsystem 58 and the transmission control subsystem 60 will be unaffected, thus continuing to perform as before.

The subsystem ECUs 66, 68, 70, 72, 74, 76 can be configured to execute commands received from the powertrain ECU 36 using a feedback control loop, a subsystem optimization algorithm or routine, or other suitable technique. In certain embodiments, for example, the subsystem ECUs 66, 68, 70, 72, 74, 76 can be configured to minimize the following subsystem optimization equation:

$$\min_{u_j} \|\lambda_j^T (\bar{x}_j - x_j)\| \quad (2)$$

subject to $$\dot{x}_j = f_j(x_j, u_j, v_j);$$
$$x_j(0) = x_j^0$$
$$h_j(u_j) \leq b_j$$
$$g_j(u_j) = c_j$$

where:
$\bar{x}_j$ refers to a target or ideal state of the subsystem;
$x_j$ refers to those elements of $u_{PT}$ and/or $x_{PT}$ relevant to the control subsystem;
$u_j$ refers to the control variables for the control subsystem;
$v_j$ refers to other powertrain parameters that are feedforward signals from the central optimization algorithm to the control subsystem;
$\lambda_j^T$ is a vector that allows different components of $x_j$ to be weighted to different extents;
$h_j(u_j) \leq b_j$ represents the inequality constraints of the control subsystem; and
$g_j(u_j) = c_j$ represents the equality constraints of the control subsystem.

In the above case, discrete-time versions of the algorithms and models will often be used, the optimization criterion may include trajectories of the state variables, and additional constraints may be included.

Using the above Equation (2), the various control variables used by the control subsystem in controlling the subsystem components and/or actuators can be optimized at the subsystem level. The control variables $u_j$ computed can then be propagated upwardly back to the global optimizer used by the powertrain ECU 36. In use, such optimization ensures that changes in load, pedal input, fuel quality, and/or other exogenous factors are responded to rapidly and reliably, allowing the vehicle to operate with improved fuel economy, reduced emissions, and improved torque response.

Figure 6:
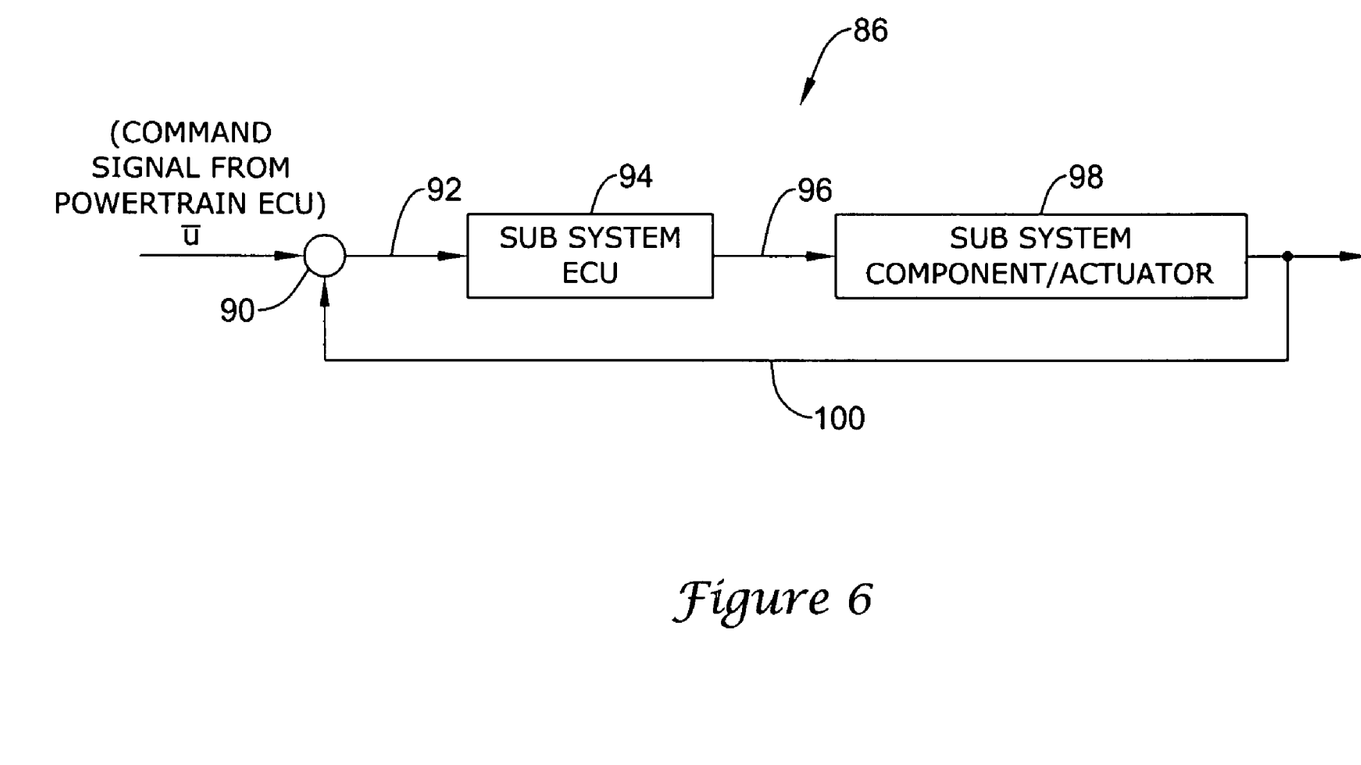
FIG. 6 is a schematic view showing an illustrative powertrain control subsystem employing a feedback control loop.

FIG. 6 is a schematic view showing an illustrative powertrain control subsystem 86 employing a feedback control loop. As shown in FIG. 6, one or more globally approximated command signals $\bar{u}$ received from the powertrain ECU can be fed through node 90, which is then provided as an input signal 92 to the subsystem ECU 94. The subsystem ECU 94 then computes one or more control set-points based on the input signal 92 and outputs a control signal 96 to one or more subsystem components and/or actuators 98. As indicated generally by feedback line 100, the output or status of the subsystem components and/or actuators 98 can fed back to node 90 along with the current globally approximated command signals $\bar{u}$ from the powertrain ECU, allowing the subsystem ECU to control the status of the subsystem components and/or actuators 98 in a closed loop manner.

Figure 7:
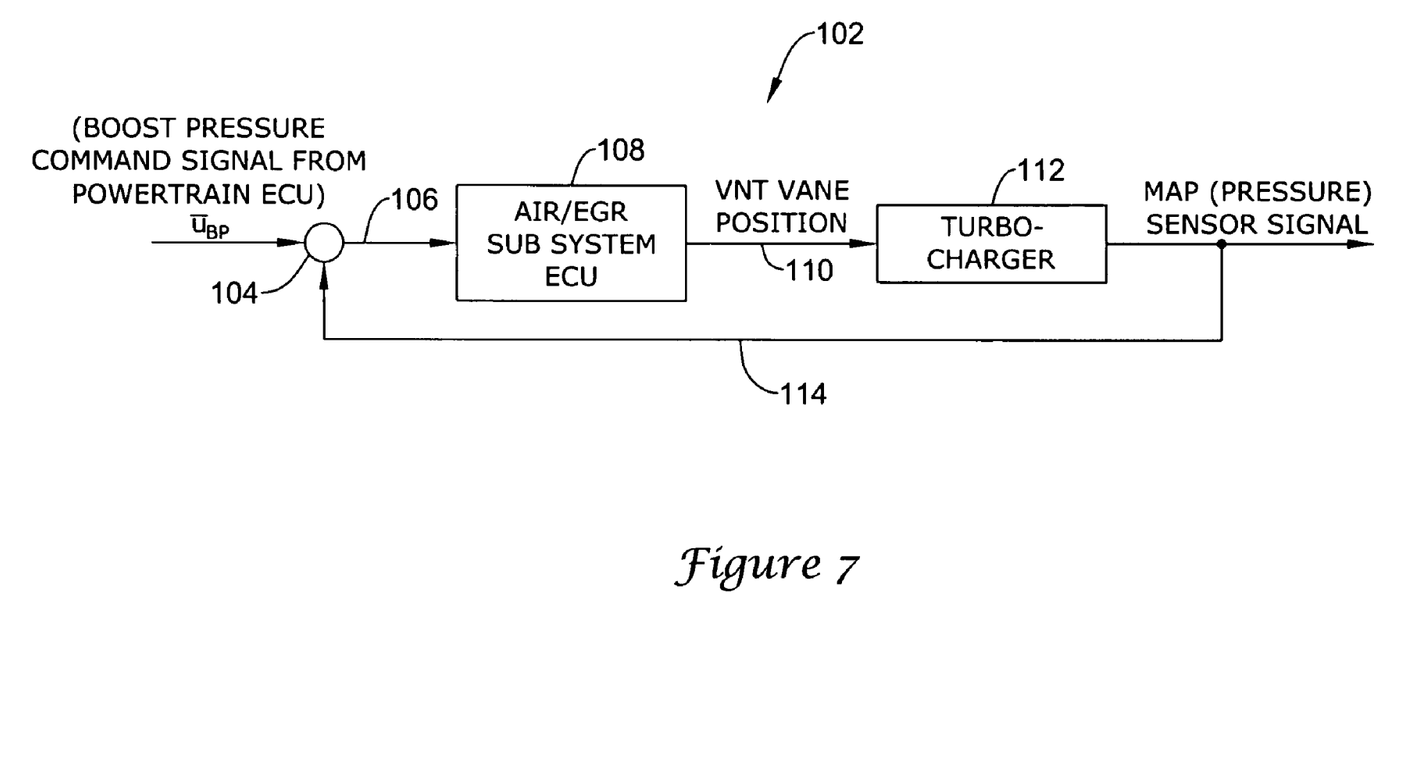
FIG. 7 is a schematic view showing an illustrative air/EGR control subsystem employing a feedback control loop to control the vane position of a turbocharger.

An example of an illustrative control subsystem 102 employing a feedback control loop for controlling the vane position of a variable nozzle turbine (VNT) turbocharger can be understood by reference to FIG. 7. As shown in FIG. 7, a globally approximated boost pressure command signal $\bar{u}_{BP}$ received from the powertrain ECU can be fed through node 104, which is then provided as an input signal 106 to an air/EGR subsystem ECU 108. The air/EGR subsystem 108 then computes and outputs a VNT vane position signal 110 that can be used to adjust the angle of attack of the vanes inside a VNT turbocharger 112 so that the boost pressure reaches the target. The adjustment of the angle of attack of the vanes causes the VNT turbocharger 112 to either increase or decrease the amount of boost pressure provided by the turbocharger, which can be measured using a manifold air pressure (MAP) sensor signal outputted by the turbocharger 112. As indicated generally by feedback line 114, the measured MAP sensor signal indicative of the boost pressure outputted by the VNT turbocharger 112 can be fed back to node 104 along with the current globally approximated boost pressure command signal $\bar{u}_{BP}$ received from the powertrain ECU, allowing the air/EGR subsystem ECU 108 to monitor the boost pressure to ensure that the command signal $\bar{u}_{BP}$ computed by the powertrain ECU is maintained at a desired level.

Figure 8:
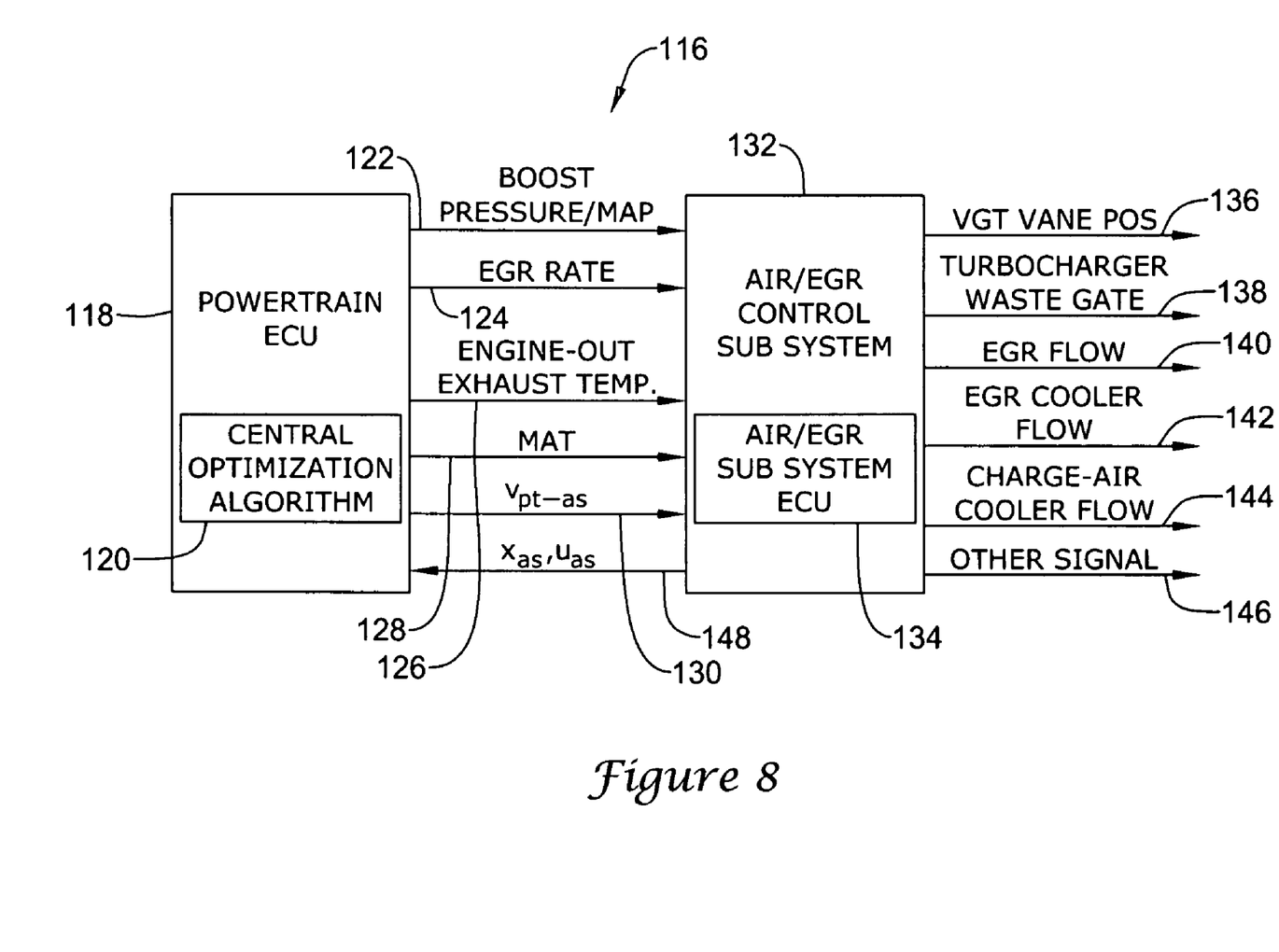
FIG. 8 is a schematic view showing an illustrative method of controlling an air/EGR control subsystem using a distributed powertrain control architecture.

FIG. 8 is a schematic view showing an illustrative method 116 of controlling the air/EGR control system using a distributed powertrain control architecture. As shown in FIG. 8, a powertrain ECU 118 adapted to execute a central optimization algorithm 120 can be configured to output a number of command signals (i.e. targets) relating to the airside control of an engine, including, for example, a boost pressure/MAP signal 122, an EGR rate signal 124, an engine-out exhaust temperature 126, and a manifold air temperature (MAT) signal 128. It should be understood, however, that the powertrain ECU 118 can be configured to output other parameters and/or signals, depending on the particular application. In some embodiments, and as further shown by arrow 130, the powertrain ECU 118 can also be configured to provide various feedforward signals $v_{PT-AS}$ from other control subsystems such as a fuel injection control subsystem, an aftertreatment control subsystem, a transmission subsystem, etc.

An air/EGR control subsystem 132 having an air/EGR subsystem ECU 134 can be configured to receive the various command signals 122, 124, 126, 128 and feedforward signals 130 from the powertrain ECU 118 and then compute one or more control signals for controlling one or more air/EGR subsystem components and/or actuators. In the illustrative embodiment of FIG. 8, for example, the air/EGR subsystem ECU 134 can be configured to output a VGT vane position signal 136 that can be used to adjust the vanes of a variable geometry inlet nozzle turbocharger (VGT). Alternatively, and in those embodiments wherein the engine employs a waste gated turbocharger, the air/side subsystem ECU 134 can be configured to output a waste gate signal 138 that can be used to operate the turbocharger waste gate. An EGR flow signal 140 outputted by the air/EGR subsystem ECU 134 can be configured to adjust the flow of exhaust gas recirculation (EGR) delivered to the engine intake. An EGR cooler flow signal 142, in turn, can be provided to adjust the temperature of recirculated exhaust air using an EGR cooler. A charge-air cooler (CAC) signal 144 can be configured to adjust the temperature of ambient air injected into the engine intake using a charge-air cooler (CAC). As indicated generally by arrow 146, one or more other control signals can also be computed and outputted by the air/EGR subsystem ECU 134, if desired. The control signals computed by the air/EGR subsystem ECU 134 $u_{AS}$ as well as the various state variables $x_{AS}$ for the air/EGR control subsystem 132 can be propagated upwardly within the distributed control architecture for use by the central optimization algorithm 120, as indicated generally by arrow 148.

The air/EGR subsystem ECU 134 can be configured to run a subsystem optimization algorithm that can be utilized to optimize one or more of the control parameters and/or signals based in part on the input parameters globally optimized at the powertrain ECU 118 level. In certain embodiments, for example, the air/EGR subsystem ECU 134 can be configured to optimize the following equation:

$$\min_{u_{AS}} \|\lambda_{AS}^T (\bar{x}_{AS} - x_{AS})\| \quad (3)$$

subject to $$\dot{x}_{AS} = f_{AS}(x_{AS}, u_{AS}, v_{PT-AS});$$

$$x_{AS}(0) = x_{AS}^0$$

$$u_{AS,\min} \leq u_{AS} \leq u_{AS,\max}$$

where:
$x_{AS}$ refers to those elements relevant to the air/EGR control subsystem;
$\bar{x}_{AS}$ refers to a target or ideal state of the air/EGR control subsystem;
$u_{AS}$ refers to the control variables for the control subsystem;
$v_{PT-AS}$ refers to other powertrain parameters that are feedforward signals from the central optimization algorithm to the air/EGR control subsystem; and
$\lambda_{AS}$ is a vector that allows different components of $x_{AS}$ to be weighted to different extents.

In the above case, discrete-time versions of the algorithms and models will often be used, the optimization criterion may include trajectories of the state variables, and additional constraints may be included.

As can be seen above, equation (3) is similar to the equation (2) described above, but as it pertains to the air/EGR control subsystem 132. A similar formulation with other subsystem-specific control variables can be performed for other subsystems such as the fuel injection control subsystem, aftertreatment control subsystem, the transmission control subsystem, etc.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A distributed control system for controlling an automotive powertrain that includes an engine, the distributed control system comprising:
a supervisory powertrain control unit configured to control one or more powertrain subsystems, the supervisory powertrain control unit configured to implement a central optimization algorithm that performs a global optimization of powertrain subsystem operation;
two or more subsystem control units in communication with the supervisory powertrain control unit, at least two of the two or more subsystem control units are configured to control an operational aspect of the engine, wherein at least two of the subsystem control units that are configured to control an operational aspect of the engine are configured to implement lower-level optimization algorithms that perform a local optimization for the corresponding subsystem using command signals outputted from the supervisory powertrain control unit as input.

2. The distributed control system of claim 1, wherein said two or more subsystem control units that are configured to implement a lower-level optimization algorithm include a fuel injection control subsystem, a glow plug control subsystem, an air/EGR control subsystem, a transmission control subsystem, and/or an aftertreatment control subsystem.

3. The distributed control system of claim 1, wherein said two or more subsystem control units that are configured to implement a lower-level optimization algorithm includes an air/EGR control unit.

4. The distributed control system of claim 3, wherein the supervisory powertrain control unit is configured to provide one or more airside commands to the air/EGR control unit.

5. The distribution control system of claim 4, wherein said one or more airside commands to the air/EGR control unit includes a boost pressure command.

6. The distribution control system of claim 4, wherein said one or more airside commands to the air/EGR control unit includes an EGR flow rate command.

7. The distribution control system of claim 4, wherein said one or more airside commands to the air/EGR control unit includes an exhaust temperature command.

8. The distributed control system of claim 1, wherein the supervisory powertrain control unit is in communication with each subsystem control unit via a controller-area network (CAN), a wireless communication network, and/or a dedicated communication link.

9. The distributed control system of claim 1, wherein the supervisory powertrain control unit is further configured to provide one or more feedforward signals to the two or more subsystem control units that are configured to implement a lower-level optimization algorithm, the feedforward signals including one or more parameters from another subsystem control unit.

10. The distributed control system of claim 1, wherein at least one of said two or more subsystem control units that are configured to implement a lower-level optimization algorithm provide commands to one or more lower-level control algorithms.

11. The distributed control system of claim 1, wherein the central optimization algorithm and/or lower-level algorithms include a number of constraint variables.

12. The distributed control system of claim 1, wherein the central optimization algorithm includes a global cost function or optimization routine.

13. The distributed control system of claim 1, wherein the central optimization algorithm includes a coarse-grained model of the powertrain system.

14. The distributed control system of claim 1, wherein the central optimization algorithm includes a steady-state model of the powertrain system.

15. The distributed control system of claim 1, wherein the lower-level algorithm outputs one or more set points for controlling the associated subsystem.

16. The distributed control system of claim 1, wherein each lower-level algorithm includes a model of the associated subsystem that is of a higher-fidelity than that used by the central optimization algorithm.

17. A distributed control system for controlling an automotive powertrain including an engine, the distributed control system comprising:
  a supervisory powertrain control unit configured to control one or more powertrain subsystems, the supervisory powertrain control unit configured to implement a central optimization algorithm that includes a global cost function or optimization routine for optimizing parameters from multiple powertrain subsystems;
  two or more subsystem control units in communication with the supervisory powertrain control unit, at least two of the two or more subsystem control units configured to control an operational aspect of the engine, wherein at least two of the at least two subsystem control units that are configured to control an operational aspect of the engine are configured to implement a lower-level optimization algorithm for performing a local optimization for the corresponding subsystem using command signals and/or feedforward signals outputted from the supervisory powertrain control unit as input; and
  wherein the lower-level algorithm outputs one or more set points for controlling one or more components and/or actuators of the corresponding subsystem.

18. A distributed control system for controlling an automotive powertrain, the distributed control system comprising:
  a supervisory powertrain control unit configured to control an air/EGR control subsystem and at least one additional powertrain subsystem, the powertrain supervisory control unit is configured to implement a central optimization algorithm for performing a global optimization across multiple powertrain subsystems;
  an air/EGR control unit in communication with the supervisory powertrain control unit, the air/EGR control unit configured to implement an airside optimization algorithm adapted to output one or more airside control signals based on command values and/or feedforward signals sent from the supervisory powertrain control unit; and
  at least one additional powertrain subsystem control unit in communication with the supervisory powertrain control unit, the at least one additional powertrain subsystem configured to implement a lower-level optimization algorithm for performing a local optimization for the at least one additional powertrain subsystem using command values and/or feedforward signals of the supervisory powertrain control unit.

19. A distributed control system for controlling an automotive powertrain including an engine, the distributed control system comprising:
  a supervisory powertrain control unit configured to control one or more powertrain subsystems, the supervisory powertrain control unit configured to implement a central optimization algorithm for performing a global optimization of powertrain subsystem operation;
  two or more subsystem control units in communication with the supervisory powertrain control unit, at least two of the two or more subsystem control units configured to control an operational aspect of the engine, wherein at least two of the at least two or more subsystem control units that are configured to control an operational aspect of the engine are configured to implement a lower-level optimization algorithm for optimizing one or more engine control parameters and/or engine control signals based at least in part on one or more globally optimized signals received from the supervisory powertrain control unit.

20. The distributed control system of claim 19, wherein the lower-level optimization algorithm optimizes a subsystem-specific cost function using the one or more globally optimized signals as input.

* * * * *